(12) United States Patent
Traenkle

(10) Patent No.: US 11,332,857 B2
(45) Date of Patent: May 17, 2022

(54) CIRCULAR KNITTING MACHINE

(71) Applicant: SIPRA Patententwicklungs- und Beteiligungsgesellschaft mbH, Albstadt (DE)

(72) Inventor: Dietmar Traenkle, Balingen (DE)

(73) Assignee: SIPRA Patententwicklungs- und Beteiligungsgesellschaft mbH, Albstadt (DE)

(*) Notice: Subject to any disclaimer, the term of this patent is extended or adjusted under 35 U.S.C. 154(b) by 222 days.

(21) Appl. No.: 16/310,041

(22) PCT Filed: May 3, 2017

(86) PCT No.: PCT/EP2017/060492
§ 371 (c)(1),
(2) Date: Dec. 14, 2018

(87) PCT Pub. No.: WO2017/215828
PCT Pub. Date: Dec. 21, 2017

(65) Prior Publication Data
US 2019/0194842 A1    Jun. 27, 2019

(30) Foreign Application Priority Data
Jun. 15, 2016 (DE) .................... 10 2016 110 981.9

(51) Int. Cl.
*D04B 1/12* (2006.01)
*D04B 15/60* (2006.01)
*D04B 1/10* (2006.01)

(52) U.S. Cl.
CPC ............ *D04B 1/126* (2013.01); *D04B 1/102* (2013.01); *D04B 15/60* (2013.01)

(58) Field of Classification Search
CPC .......... D04B 1/126; D04B 1/102; D04B 15/60
See application file for complete search history.

(56) References Cited

U.S. PATENT DOCUMENTS

| 2,696,096 A | * | 12/1954 | Haddad ................... D04B 9/26 |
| | | | D2/980 |
| 3,050,970 A | | 8/1962 | Billi |
| 3,174,307 A | | 3/1965 | Mayer |
| 3,511,064 A | | 5/1970 | Major et al. |
| 3,774,412 A | | 11/1973 | Schichman |

(Continued)

FOREIGN PATENT DOCUMENTS

| DE | 1069813 B | 11/1959 |
| DE | 1148347 B | 5/1963 |

(Continued)

OTHER PUBLICATIONS

Taiwanese Office Action dated Jul. 3, 2020 in Taiwanese Application No. 106117235 with English translation.

(Continued)

*Primary Examiner* — Danny Worrell
(74) *Attorney, Agent, or Firm* — Collard & Roe, P.C.

(57) ABSTRACT

A single- or double-knit circular knitting machine having a cylinder (11) equipped with cylinder needles and/or a dial equipped with dial needles for the production of single- or double-jersey knitted webs, which machine has at least one thread-selection device, threads being able to be supplied to any cylinder- and/or dial needle by the thread-selection device.

18 Claims, 2 Drawing Sheets

(56) References Cited

U.S. PATENT DOCUMENTS

Figure 1:
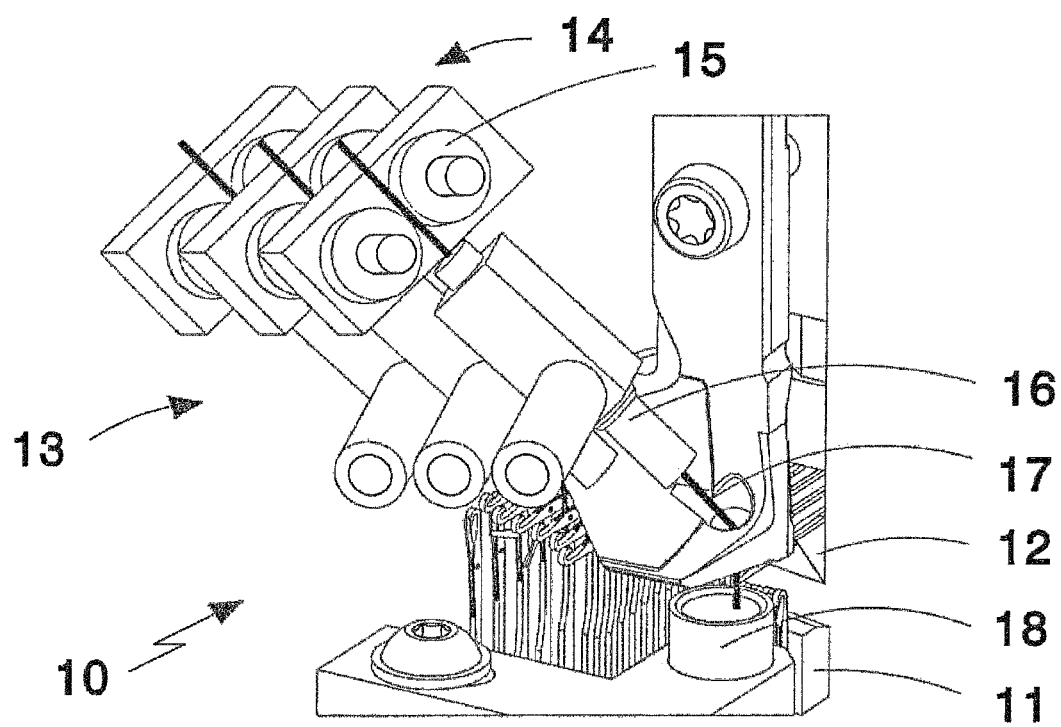

| | | | | |
|---|---|---|---|---|
| 4,193,274 | A | * | 3/1980 | Gostelow ............... D04B 15/60 66/140 R |
| 4,385,507 | A | * | 5/1983 | Sawazaki ............... D04B 15/61 66/140 R |
| 5,046,333 | A | * | 9/1991 | Sawazaki ............... D04B 15/61 66/140 R |
| 5,070,709 | A | * | 12/1991 | Guell ..................... D04B 15/60 66/140 R |
| 6,058,742 | A | | 5/2000 | Dalmau Guell |
| 7,036,343 | B1 | * | 5/2006 | Wei ........................ D04B 15/58 66/134 |
| 7,055,348 | B1 | * | 6/2006 | Wei ........................ D04B 15/58 66/134 |
| 7,536,879 | B2 | | 5/2009 | Vanwelden |
| 7,845,196 | B1 | * | 12/2010 | Pai ......................... D04B 15/61 66/133 |
| 10,472,749 | B2 | * | 11/2019 | Lonati .................... D04B 15/60 |
| 2015/0075227 | A1 | | 3/2015 | Tsujigo et al. |

FOREIGN PATENT DOCUMENTS

| | | |
|---|---|---|
| DE | 1148348 B | 5/1963 |
| DE | 1635817 A1 | 8/1971 |
| DE | 2309360 A1 | 9/1973 |
| EP | 1975294 A1 | 10/2008 |
| EP | 2857566 A1 | 4/2015 |
| GB | 1426094 | 2/1976 |

OTHER PUBLICATIONS

Taiwanese Search Report dated Jun. 9, 2020 in Taiwanese Application No. 106117235 with English translation.

International Search Report of PCT/EP2017/060492, dated Aug. 8, 2017.

English Translation of International Preliminary Report on Patentability for PCT/EP2017/060492 dated Dec. 27, 2018.

Indian Office Action dated Dec. 3, 2021 in Indian Application No. 201817047005.

* cited by examiner

CIRCULAR KNITTING MACHINE

CROSS REFERENCE TO RELATED APPLICATIONS

This application is the National Stage of PCT/EP2017/060492 filed on May 3, 2017, which claims priority under 35 U.S.C. § 119 of German Application No. 10 2016 110 981.9 filed on Jun. 15, 2016, the disclosures of which are incorporated by reference. The international application under PCT article 21(2) was not published in English.

BACKGROUND OF THE INVENTION

The invention relates to a single- or double-knit circular knitting machine having a cylinder equipped with cylinder needles and/or a dial equipped with dial needles for the production of single- or double-jersey knitted webs, which machine has at least one thread-selection device.

With such machines, single- or double jersey knitted webs with different patterns can be produced, in particular with coloured patterns or patterns using fancy yarns. Via the thread-selection devices, the threads required for pattern production are supplied to the needles of the knitting machine. In this way, for example knitted fabrics with stripe patterns or mattress cover materials with three-dimensional structural patterns and/or with patterns produced by coloured threads or fancy yarns can be produced.

Precisely in the case of patterned mattress cover materials, the fancy or coloured yarns are required only selectively at a few places in the knitted fabric. This applies all the more if only individual logos or image motifs are intended to be knitted in (Intarsia pattern). The special threads required for this purpose must be knitted in, floated and at points, on the reverse side of the knitted fabric at those places where they are not intended to be visible on the visible side of the knitted fabric, which is described for example in EP 1 975 294 A1. These threads floated on the reverse side represent however unnecessary material consumption. With the machines of the initially described type, which have been available to date on the market and are disclosed in print for example in U.S. Pat. No. 6,058,742, this unnecessary material consumption can only be avoided in a restricted manner. With the thread-selection devices or striping apparatus, threads can be supplied to the knitting needles and removed from the knitting process only in rotation and only at established change points.

SUMMARY OF THE INVENTION

It is therefore the object of the present invention to develop a circular knitting machine for the production of patterned single- or double-jersey knitted fabrics such that the thread material consumption for pattern production can be further minimised.

The object is achieved by a single- or double-knit circular knitting machine having a cylinder equipped with cylinder needles and/or a dial equipped with dial needles for the production of single- or double jersey knitted webs, which machine has at least one thread-selection device and is characterised in that threads can be supplied to any cylinder- and/or dial needle by the thread-selection device.

With this machine, it is possible, for production of Intarsia or other patterns, to supply the Intarsia threads required for this purpose only to those places on the circumference of the tubular knitted fabric in which the Intarsia patterns are intended to be formed, the Intarsia patterns being able to be disposed at any circumferential place. Between the individual Intarsia portions of a knitting row, the Intarsia threads need not be guided to float on the reverse side. Rather, they can be cut off at the end of an Intarsia portion and supplied again to the next Intarsia portion. According to the pattern, some significant savings in thread material can consequently be achieved. In addition, the transverse elasticity of the knitted fabric is not impaired by threads situated floating on the reverse side of the knitted fabric. A further advantage resides in the fact that the entire tubular knitted fabric can be used and, unlike fabric webs produced on known machines, the thread change points need not be removed from the tubular knitted fabric. If it is required for pattern production, a thread-selection device can be thereby provided at each knitting system. Also feeding weft threads into the needles of only one of the knitting heads is possible with the machine. Consequently, for example reinforcement or electrically conductive regions can be introduced into the knitted fabric.

Preferably, the thread-selection device can have at least one thread-clamping- and feed device, with which the threads can be supplied to the knitting needles and removed again from the knitting process.

It is thereby particularly preferred if the thread-clamping- and feed device has a thread-transport unit, in particular a thread-transport nozzle. If the thread is transported by an air flow, no mechanical parts require to be moved for the thread transport. The thread feed can hence be effected very rapidly. It is possible in addition to dispense with thread guides or other additional aids for the thread feed. Of course, the thread transport unit can however also be a mechanical device.

The thread feed can also be improved in addition by the thread-selection device having a suction funnel for receiving the starting ends of the threads. Hence the starting ends of the threads can be fixed until the first stitch has been formed with the thread.

In the case of a double-knit circular knitting machine, it is thereby particularly advantageous if the thread-transport units and the suction funnel can be disposed relative to each other such that the thread, which is supplied by the thread-transport unit and the free end of which is received by the suction funnel, can be gripped by a dial needle in a feed region which is situated radially outside the cylinder needles and can be drawn into a knitting region. A stitch or a tuck loop can then be formed by a dial needle. Of course, the transport units and the suction funnel can also be disposed such that a stitch or a tuck loop can be formed by a cylinder needle.

Furthermore, it is advantageous if the thread-clamping- and feed device has an actuatable pair of transport rollers, the rollers of which can be moved apart. With the pair of transport rollers, thread feed and thread clamping can be achieved. If the rollers are moved apart, the feed- and clamping function is interrupted.

The thread supply can be effected solely by the pair of transport rollers. Advantageously, the thread-selection device has however one pair of transport rollers for each suppliable thread, with the help of which and with cooperation of the thread-transport unit, a starting end of a thread can be supplied to the suction funnel and/or to the knitting needles.

The thread-selection device is required only for feeding in a starting end of a thread and for removing a thread from the knitting process. Preferably, the thread-clamping- and feed device can therefore be deactivatable during the knitting process.

Further advantages arise if the thread-selection device has cutting units for each suppliable thread. Hence, the pattern- or Intarsia threads can be separated directly after the corresponding pattern portion and the knitted fabric can be knitted further with a basic thread. Hence very short starting ends of the thread and ends of the thread can hence be produced.

Expediently, during the cutting process by the cutting unit, the thread-clamping- and feed device can thereby be activatable for this thread for thread clamping. The clamped thread is hence ready for renewed thread feed by the thread-selection device.

The thread-selection device can have a pneumatic and/or electrical control unit. In particular if a pneumatic transport nozzle is provided, a pneumatic control unit offers advantages.

The invention has particular advantages if the circular knitting machine is a Jacquard machine with a single-needle selection device for cylinder- and dial needles. With such a machine, the greatest variety of knitted fabrics and patterns can be produced.

For economic fabric manufacture, in addition, the circular knitting machine can preferably have a knitting speed of more than 0.6 m/s. The system density can be at least 1.6 systems per inch of machine diameter. A thread-selection device can thereby be disposable on each system.

Furthermore, the circular knitting machine is preferably a machine in which the cylinder and/or the dial can be actuated to rotate only in one direction.

The invention relates, in addition, to a method for the production of a double jersey tubular knitted fabric with Intarsia patterns on a double-knit circular knitting machine according to the invention, which is characterised in that an Intarsia thread which is required for the production of an Intarsia pattern field is supplied by the thread-selection device to a needle of that knitting head—cylinder or dial—on which the reverse side of the tubular knitted fabric is produced and, for binding in the starting end of the Intarsia thread at least with this needle, a stitch is formed on the knitting head before, on the other knitting head on which the visible side of the tubular knitted fabric is produced, stitches for the Intarsia field are knitted, and subsequently, on the first knitting head, at least one stitch is knitted with the Intarsia thread before the Intarsia thread is cut off.

According to the method according to the invention, Intarsia patterns with a large number of short threads are formed, the starting end of the thread and the thread end of the Intarsia threads being fixed respectively on the reverse side by knitting into the knitted fabric.

Hence, no subsequent sewing work is required for securing the thread ends to the knitted fabric. According to the yarn quality, knitting can thereby also be necessary over a plurality of stitches on the reverse side of the knitted fabric.

At the beginning of an Intarsia field, the Intarsia thread can thereby be supplied to the needle on the reverse-side knitting head by the thread-clamping- and feed device of the thread-selection device. After forming stitches for the Intarsia field when the thread-clamping- and feed device is deactivated, during cutting of the Intarsia thread, this can be clamped by the thread-clamping- and feed device. The thread is hence ready for renewed thread feed into the needles for the next Intarsia field, whilst the knitting row is knitted further and up to there with a basic thread.

A preferred embodiment of a thread-selection device, of a knitting machine according to the invention and an embodiment of a method according to the invention is described subsequently in more detail with reference to the drawing.

BRIEF DESCRIPTION OF THE DRAWING FIGURES

Figure 2:
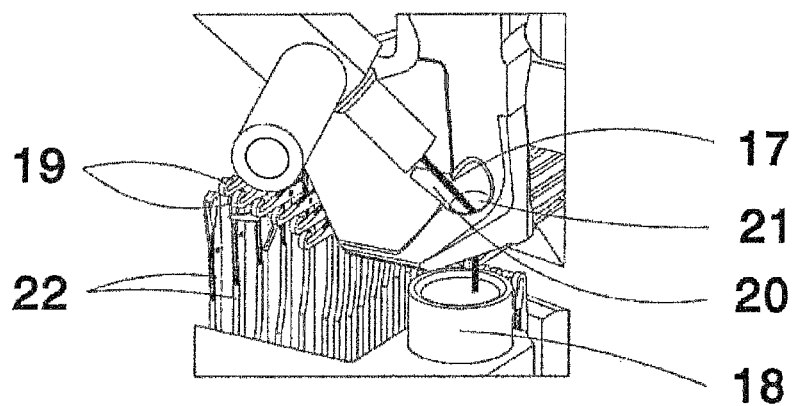
Figure 3:
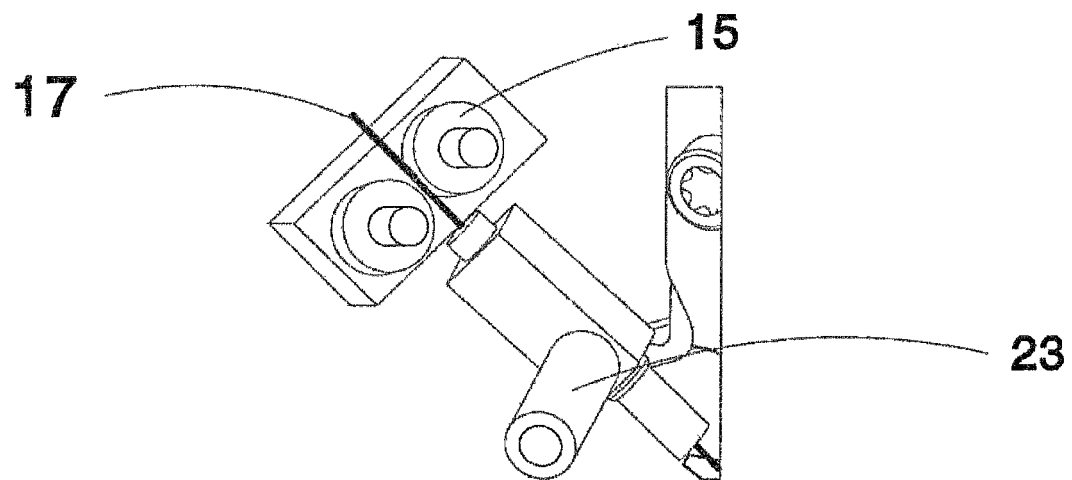

FIG. 1 a partial view of a circular knitting machine with a thread-selection device;

FIG. 2 a detailed illustration of the thread-clamping- and feed device during the thread feed;

FIG. 3 a detailed illustration of the thread-clamping- and feed device before a thread change.

DETAILED DESCRIPTION OF THE INVENTION

In FIG. 1, a section of a circular knitting machine 10 with a needle cylinder 11 and a dial 12 is illustrated. Furthermore, the knitting machine 10 has a thread-selection device 13 with which three different threads can be supplied. For this purpose, the thread-selection device 13 has a thread-clamping- and feed device 14 for each thread. Each thread-clamping- and feed device 14 is provided with a pair of transport rollers 15 and also with a thread-transport nozzle 16. The pair of transport rollers 15 and the thread-transport nozzle 16 move the start of a thread 17 up to a suction funnel 18. In this position, the thread 17 can be moved by a dial needle 19 from a thread-feed region 20 into a knitting region 21, as FIG. 2 illustrates. With the dial needles 19 and the thread 17, a few stitches are formed on the reverse side of the knitted fabric to be formed in order to bind in the start of a thread into the knitted fabric.

FIG. 3 shows the state of the thread-clamping- and feed device 14 after the thread feed into the dial needles 19. The transport rollers 15 are moved apart. The thread 17 is drawn freely through the rollers 15 and the now likewise inactive transport nozzle 16 until stitches are formed with the thread 17. This takes place firstly on a few dial needles 19 and subsequently, corresponding to the pattern to be produced on the visible side of the knitted fabric, with cylinder needles 22 (FIG. 2). If the pattern region is prepared on the visible side, stitches are formed again with a few dial needles 19 in order also to bind in the thread end on the reverse side of the knitted fabric before the thread 17 is clamped by the transport rollers 15 and is cut with a cutting device 23. The free end of the thread 17 anchored in the knitted fabric can thereby be gripped by a thread brake (not illustrated) in order to maintain the required thread tension. The thread 17, which is retained clamped by the transport rollers 15, is thereafter available once again for renewed thread feed according to FIG. 2 on a different circumferential portion of the knitted fabric. After knitting with the thread 17, the knitting row is knitted further with a basic thread (not illustrated here). This can be floated on the reverse side if an Intarsia field is knitted with the thread 17 on the visible side. If however the Intarsia fields are very large and/or very many Intarsia fields are provided over the circumference of the knitted fabric, then also the basic thread can be supplied to the needles 19, 22 by thread-selection devices 13 in the same way as the Intarsia thread 17 and be removed from the knitting process during knitting of Intarsia fields.

Formation of thread-clamping- and feed mechanism 14 with a thread-transport nozzle 16 and a pair of transport rollers 15 is only one possible embodiment which is however distinguished by only a few mechanical parts requiring to be moved, as a result of which very high knitting speeds can be achieved. The air flow of the nozzle 16 ensures in addition that guides for thread feed can be dispensed with.

What is claimed is:

1. A circular knitting machine having at least one of a cylinder (11) equipped with cylinder needles (22) or a dial (12) equipped with dial needles (19) for the production of single- or double-jersey knitted webs, which machine has at least one thread-selection device (13), wherein the thread selection device (13) has at least one thread-clamping and feed device (14) and cutting units (23), wherein the thread-clamping and feed device supplies at least one thread (17) to any cylinder- or dial needle (22, 19) for production of Intarsia portions, wherein the circular knitting machine is configured to produce several Intarsia portions within a single stitch course, so that the thread is cut off at the end of an Intarsia portion, by one of the cutting units (14) and supplied again to the next Intarsia portion by the thread-clamping and feed device (14).

2. The circular knitting machine according to claim 1, wherein the thread-clamping- and feed device (14) has a thread-transport unit.

3. The circular knitting machine according to claim 1, wherein the thread-selection device (13) has a suction funnel (18) for receiving starting ends of the threads.

4. The circular knitting machine according to claim 3, wherein the circular knitting machine has the cylinder (11) equipped with cylinder needles (22) and the dial (12) equipped with dial needles and wherein the thread-transport unit (16) and the suction funnel (18) are disposed relative to each other such that the thread (17), which is supplied by a thread transport unit (16) and a free end of which is received by the suction funnel (18), is gripped by one of the dial needles (19) in a feed region (20) which is situated radially outside the cylinder needles (22) and is drawn into a knitting region (21).

5. The circular knitting machine according to claim 1, wherein the thread-clamping- and feed device (14) has an actuatable pair of transport rollers (15).

6. The circular knitting machine according to claim 1, wherein the thread-selection device (13) has one pair of transport rollers (15) for each thread (17) to be supplied by the thread-selection device, with the help of which and with cooperation of the thread-transport unit (16), a starting end of a thread is supplied to the suction funnel (18) or to the knitting needles (19, 22).

7. The circular knitting machine according to claim 1, wherein the thread-clamping- and feed device (14) is configured to be deactivated during the knitting process by a control unit.

8. The circular knitting machine according to claim 1, wherein, during a cutting process by the cutting unit (23), the thread-clamping- and feed device (14) is configured to be activated for thread clamping by a control unit.

9. The circular knitting machine according to claim 1, wherein the thread-selection device (13) has a pneumatic or electrical control unit.

10. The circular knitting machine according to claim 1, wherein the circular knitting machine guides thread solely with the thread selection device.

11. The circular knitting machine according to claim 1, wherein it is a Jacquard machine with a single-needle selection device for cylinder- and dial needles (22, 19).

12. The circular knitting machine according to claim 1, wherein it has a knitting speed of more than 0.6 m/s.

13. The circular knitting machine according to claim 1, wherein the knitting machine has at least 1.6 systems per inch of machine diameter.

14. The circular knitting machine according to claim 13, wherein a thread-selection device (13) is disposed on each system.

15. The circular knitting machine according to claim 1, wherein the cylinder (11) or the dial (12) are configured to be actuated to rotate only in one circumferential direction.

16. A method for the production of a double-jersey tubular knitted fabric with Intarsia patterns on a circular knitting machine according to claim 1, wherein the circular knitting machine has a first knitting head and a second knitting head, comprising the steps of:

supplying an Intarsia thread (17) which is required for the production of an Intarsia pattern field by the thread-selection device (13) to a needle (19) of the first knitting head (12) cylinder (11) or dial (12) on which the reverse side of the tubular knitted fabric is produced and, forming a stitch on the first knitting head for binding in a starting end of the Intarsia thread (17) at least with this needle (19), knitting stitches for the Intarsia field on the second knitting head on which the visible side of the tubular knitted fabric is produced, and subsequently, knitting at least one stitch on the first knitting head (12), with the Intarsia thread (17) before the Intarsia thread (17) is cut off by a cutting unit (23) of the thread selection device and is again supplied by a thread clamping and feed device (14) of the thread selection device (13) within a same stitch course to produce a next Intarsia field.

17. The method according to claim 16, wherein the Intarsia thread (17) is supplied to the needle (19) on the reverse-side knitting head (12) by a thread-clamping- and feed device (14) of the thread-selection device (13) and then the thread-clamping- and feed device (14) is deactivated.

18. The method according to claim 17, wherein, during cutting of the Intarsia thread (17), the Intarsia thread is clamped by the thread-clamping- and feed device (14).

* * * * *